United States Patent Office 2,769,420
Patented Nov. 6, 1956

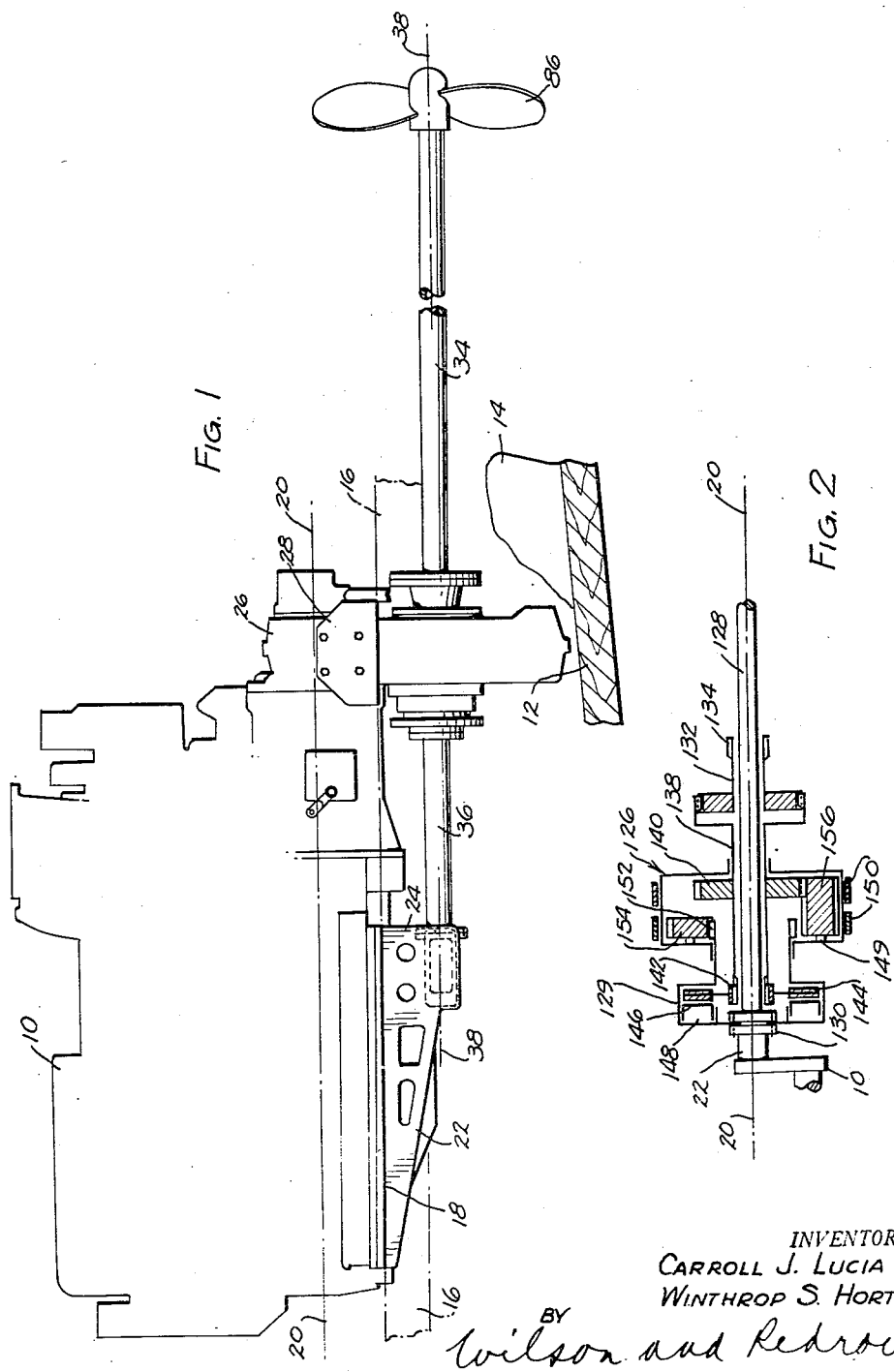

2,769,420

MARINE PROPULSION MECHANISM

Winthrop S. Horton, Farmington, and Carroll J. Lucia, Birmingham, Mich., assignors to Studebaker-Packard Corporation, a corporation of Michigan Application August 31, 1953, Serial No. 377,418

17 Claims. (Cl. 115—34)

The present application relates generally to the subject of propeller driven surface vessel propulsion and to marine propulsion mechanism especially suited therefor, particularly engine powered transmission and reduction mechanism in which the speed reduction is accomplished primarily in a pinion and gear off-set type, shaft reinforced casing unit subject to direct propeller shaft thrusts.

Hitherto known off-set type marine propeller reduction units for power producing engines require rather large sizes of housing structure cases owing to the extensive nature of diameter and thickness of the off-set output or bull gear housed therein and in addition to their size, they are usually thick-walled and bulky owing to their added function of having to withstand and transmit the propeller shaft thrusts. An object of the present invention is to provide as between an engine bed for the power engine and a bull gear of the foregoing off-set housed type, a stiff thrust transmitting strut or shaft for relieving the housing case of thrust imposed loads due to the propeller shaft. As a result, though the size of the gear case is still necessarily large in order that it can house a large bull gear, there is no further need for bulk in the walls of the structure nor need for the added weight and structural strength thereof, inasmuch as the casing is substantially entirely relieved of one phase of its usual dual function of housing the gear and serving as a thrust absorbing structural member.

Another object is to provide in a reduction-casing-enclosed precision aligned pinion and gear assembly, a thrust bearing which though included within the actual structure of the reduction case as thrust bearings ordinarily are expected to be found included, is included at a location so as to be carried by one of two cooperating telescopically related parts detachably secured together within the hub of the gear and separable to permit ready removal of such one part and the bearing from the case without interference with the precise alignment between the pinion and the gear.

An additional object is the provision of an assembly arrangement of a supported fixed shaft, an axially aligned propeller shaft rotatably mounted in a gear casing and having a flexible torque transmitting disc secured thereto, and a thrust bearing between the shafts received in an end of the gear casing, in which arrangement a set of shims is provided at the supported end of the fixed shaft to allow axial adjustment of both shafts and the bearing with respect to the flexible disc so as to relieve the latter of residual strains due to inaccuracies of assembly of the arrangement. In the accomplishment of such object, the thrust bearing between shafts is contained in one of a pair of axially slidable casing-supported tubular parts which permits such adjustment without altering the position of the gear casing.

According to a feature of the present invention, there is provided a dually adjustable multiple race thrust bearing assembly of tubular construction for rotatably supporting a shaft within a companion tubular hub portion of a gear casing or the like, wherein the bearing races are laterally adjustably shiftable with respect to the axis of the hub owing to a predetermined lateral clearance therein provided and wherein the tubular bearing construction is slidably received in the companion tubular hub portion so as to be axially adjustable relative thereto.

Further objects, features and advantages will either be specifically pointed out or become apparent when for a better understanding of the invention, reference is made to the following written description taken in conjunction with the accompanying drawings in which:

Figure 1 is a side view of an engine powered propulsion mechanism in the environment of a marine surface vessel;

Figure 2 is a schematic longitudinal section of the forwardly and reversely driving component of the transmission in the marine propulsion mechanism of Figure 1;

Figure 3:
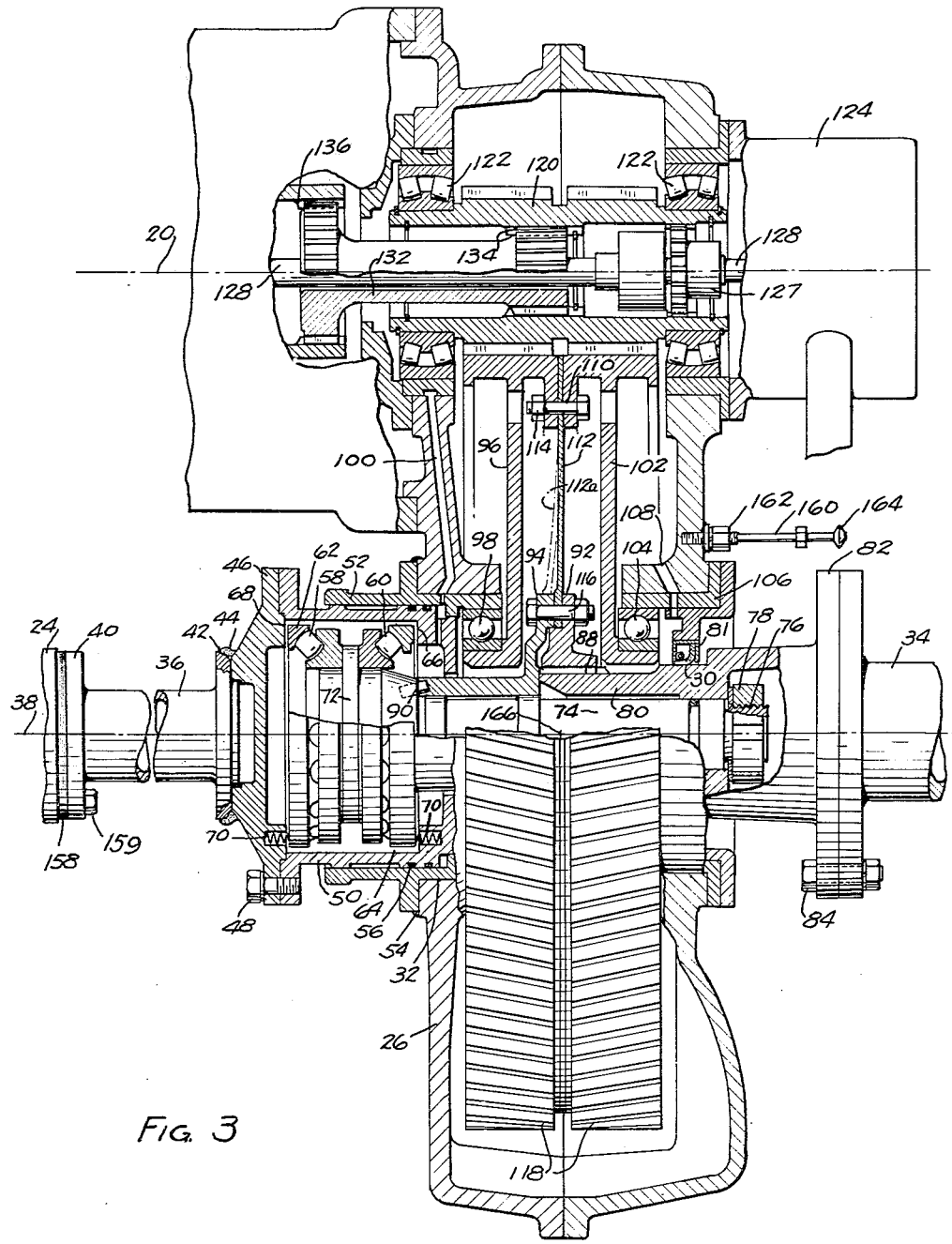
Figure 3 is a longitudinal sectional view of the off-set type reduction gear component of the transmission in the marine propulsion mechanism.

In the drawings, a multi-cylinder internal combustion marine engine 10 which may be of the diesel type, is shown adapted to the environment of a marine surface vessel which is propelled thereby and which includes a horizontally disposed keel 12 forming part of a hull 14. The hull 14 incorporates a plurality of heavy longitudinal structural members 16. A bed 18 is bolted to the engine 10 at a lower portion thereof for supporting the same and the bed 18 is in turn mounted by suitable brackets and plates to the longitudinal structural members 16 in the vessel's hull 14.

The engine 10 has a principal longitudinal axis 20 which declines rearwardly with respect to the horizontal plane of the keel 12 and which passes through the center of the engine's main bearings and a crankshaft 22 rotatably mounted therein; the mid plane of the engine 10 is constituted by the vertical plane containing the principal axis 20.

The engine bed 18 integrally incorporates a rigid central rib or back bone 22 which is disposed substantially in the noted mid plane of the engine 10 and which has a rather deep depending cross beam portion 24 disposed at the rear of the engine and effective for rigidly resisting two-way thrusts. Disposed in a plane transverse of the rear of the engine 10, a relatively light fabricated case 26 is provided for a forward and reversely driving transmission of the off-set gear reduction type. The case 26 has a pair of brackets such as at 28, one at each side for rigidly securing the same to the structural members 16 in the vessel's hull 14.

The noted off-set in the case 26 is in a vertically downward direction and the case includes a centrally disposed pair of enlarged coaxial openings 30 and 32 at the opposite ends thereof. Extending in opposite directions from the respective central openings 30, 32 in spaced apart registry therewith, there are provided a tubular propeller shaft 34 and a stiff propeller thrust resisting means which may be in the form of a rigid tubular shaft 36. The shafts 34, 36 are substantially coaxial with one another and their common axis 38 is arranged in parallel to the longitudinal axis 20 of the engine and disposed in the vertical mid plane of the same. A flanged outer end portion 40 on the shaft 36 has a connection to the deep sectioned rigid depending portion 24 of the engine bed 18. The opposite or inner end portion indicated at 42 on the fixed shaft 36 is welded at a circumferential joint 44 to a flanged closure head or end cover 46 secured as by two or more bolts 48 to a tubular thrust bearing box 50. The thrust bearing box 50 is received within and is slidably related to a tubular hub sleeve 52 which is secured to the case 26 as by welding around a circumferential joint 54. The relatively inner one of the two slidably related tubular parts 50, 52 has a pair of spaced apart annular recesses, each of which receives a rubber O-ring seal 56 for sealing the parts together. In the interior of the tubular bearing box 50 which has a predetermined inside diameter, a span of tapered roller thrust bearings 58, 60 is located having the respective pairs of inner and outer races 62 thereof of a diameter smaller at all points than said predetermined diameter so as to afford a predetermined amount of lateral clearance diametrically of the sides of the bearing in the radial spaces indicated at 64. An illustrative example of one such predetermined amount of lateral clearance is 0.010 inch radial interval all around the outside of the outer races 62, or 0.020 inch total diametrical clearance where the bearings have a predetermined 7.5 inch O. D. Under the figures of such representative example, the predetermined internal diameter of the tubular bearing box 50 is at least $$\frac{.020 \times 100}{7.500}$$

or approximately 3/10% greater diameterwise than the predetermined O. D. of the outer bearing races 62. At the opposite ends of the pair of outside races 62 a pair of shoulders 66, 68 is provided, one of which is an inwardly offset annular flange integral with the bearing box 50 and the other of which is formed on the bottom of the end cover 46. At three or more circumferentially spaced locations on each of the shoulders 66, 68, a recess is formed for receiving a corresponding number of yieldable take-up means 70 which may be in the form of elastic coil springs engaging the pair of outer races 62. The resulting yieldable engagement prevents play or looseness from developing in the span of bearings.

Between the pair of inner races 62 a flanged portion 72 on the distal end of a shaft piece 74 is clamped for rotatably supporting the shaft piece 74. A threaded extension 76 on the opposite end of the shaft piece 74 threadably carries a retaining nut 78 for detachably connecting together the shaft piece 74 and another shaft piece 80 which telescopically receives the latter to form a stub shaft unit and extends in the opposite direction to a relatively distal end carrying a flange 82. A garter-spring-loaded leather seal 81 which is mounted in the case 26 to define the central opening 30 thereof sealingly engages the shaft piece 80 intermediate its ends. The flange 82 on the distal end of the shaft piece 80 is bolted by two or more threaded fasteners 84 to a companion flange on one end of the propeller shaft 34, whereas a thrust-load-imposing marine propeller 86 is carried at the opposite end of the propeller shaft 34. The propeller 86 may be of either hand but as shown is a left handed propeller. The shaft piece 80 carries a set of splines 88 and the telescopically received shaft piece 74 carries a dowel pin 90. Surrounding the shaft pieces 74, 80 a flanged bipartite hub structure is provided, of which one part 92 is made fast to the piece 80 by means of the splined connection at 88 and the other part 94 of which is made rotatably fast to the piece 74 by means of an appropriate socketed engagement with the dowel pin 90.

A centrally open bipartite herring bone gear structure surrounds the hub parts 92, 94 and has one of its radiating web parts 96 precisely journaled in a set of radial-and-thrust type ball bearings 98 mounted within the tubular hub part 52 secured to the gear case 26. An appropriate internal oil passage 100 in the gear case 26 provides for lubrication of the bearings 98. The companion radiating web part 102 of the herring bone gear structure has a cylindrical hub flange which is precisely journaled for rotation by means of a radial-and-thrust type bearing 104 mounted in a tubular hub part 106 received in the transmission case 26.

An appropriate lubricating oil passage 108 disposed internally of the case 26 permits adequate lubrication of the radial ball bearing 104. The two parts 96, 102 of the bipartite gear structure have a pair of opposed radially inwardly extending flanges 110 adjacent their outer periphery between which there is clamped a flexible open-centered circular disc 112 formed of thin spring steel. The flanges 110 and the disc 112 are firmly secured together by three or more circumferentially spaced bolts 114. The steel disc 112 functionally is a thin plate relatively stiff in torsion but capable of being twisted or canted slightly out of plane or deflected axially so as to approach different deformed positions on either side of its normal plane such as at the dotted line position 112A shown in dotted lines in Figure 3.

The inner periphery of the disc 112 is bolted between the opposed flanges of the bipartite hub structure 92, 94 by means of three or more circumferentially spaced threaded fasteners 116. The two herring bone gear parts 96, 102 are respectively right and left handed helical gears insofar as their teeth 118 are concerned and these gear teeth mesh with a unitary left and right handed herring bone pinion 120 which drives the gear. The reduction ratio effective between the teeth of the pinion 120 and the teeth 118 of the gear may be selected from several available satisfactory ratios, one illustrative example occurring for instance in use of a 24 tooth pinion and 120 tooth gear arrangement which yields an effective speed reduction ratio of 5:1.

At each end of the pinion 120 two rows of radial-and-thrust bearings 122 are provided for precisely journalling the same in the transmission case 26. An accessory drive mechanism 124 secured to the case 26 adjacent one of the bearings 122, has a long drive shaft 128 drivingly connected thereto and journalled in a two race bearing 127 of which the outer race is splined to and supported in the interior of the herring bone pinion 120.

Means may be provided for driving the accessory mechanism 124 and for driving the herring bone pinion 120. Illustrative of one such means is a forwardly and reversely driving transmission component 126 through which the centrally disposed accessory drive mechanism shaft 128 freely extends. The shaft 128 is flanged and bolted thereat through an interposed clutch housing 129 to the crankshaft 22 as at 130 and is driven at all times in synchronized rotation with the crankshaft of the engine 10 and the rotatable clutch housing 129.

A hollow quill shaft 132 independently rotatably surrounds the accessory drive shaft 128 and is made fast by means of a pair of mating splines 134 at one end to the herring bone drive pinion 120. The quill shaft 132, Figures 2 and 3, is enlarged at its opposite end and connected by another set of splines 136, Figure 3, to an elongated hollow shaft 138, Figure 2, extending through the component 126 to a location within the clutch housing 129. The corresponding ends of the accessory drive shaft 128 and the elongated hollow shaft 138 are arranged such that the ends of the shaft 128 extend beyond the ends of the shaft 138, and considerably so adjacent the quill shaft 132.

Intermediate its ends the hollow shaft 138 carries an output sun gear 140 splined thereto and at its end in the clutch housing 129 the shaft 138 carries a clutch disc hub 142 splined thereto and supporting a clutch friction disc 144. A clutch piston 146 which is axially shiftable under internal fluid pressure or other thrust from within a clutch chamber 148, is arranged to engage the friction disc 144 so as to cause the long hollow shaft 138 to rotate as a unit with the clutch housing 129 which is rigid with the engine crankshaft 22.

The transmission component 126 is of the epicylic planetary type consisting of a rotatable carrier member 149 which may be braked as by dual brake bands 150 which are more completely described and shown in the co-pending application, Serial No. 383,274 filed September 30, 1953 jointly in the names of Winthrop S. Horton and Carroll J. Lucia, the co-inventors herein.

The clutch housing 129 has a reduced extension which splinedly carries an input sun gear 152 disposed within the carrier 149 and meshing with each one of a plurality of rotatable shortplanet pinion 154 which are journalled to and carried by the carrier 149. The short-planet pinions 154, preferably three in number, mesh with a corresponding number of long planet pinions 156 which are journalled for rotation in the carrier member 149 and are enmeshed with the output sun gear 140. Under appropriate control of the clutch piston 146 and the dual band brake 150 so as to selectively engage the one or the other, the forward and reversely driving planetary component 126 is operated in well-known manner to cause the quill shaft 132 to rotate in the direction with or in the opposite direction of the engine crankshaft 122, all as more completely described in the noted co-pending Horton and Lucia application, Serial No. 383,274. Regardless of the operation of the planetary component 126, the accessory drive mechanism shaft 128 and the friction disc clutch 144 will continue to operate in the direction of rotation of the crankshaft 22 of the engine 10.

The prime power mechanism of Figures 1 and 3 is structurally integrated together at the noted connection between the end 40 of the fixed stiff shaft 36 and the deep depending portion 24 of the engine bed 18. A series of laminations of shim stock 158 is included in such connection which is bolted together as by a set of three or more threaded fasteners 159. The layers of shim stock 158 may be progressively added or removed to permit adjustable axial movement of the fixed shaft 36, the telescopically related stub shaft pieces 74, 80, the bipartite hub structure 92, 94, and the propeller shaft 34 with the relationship to the herring bone gear 96, 102 which is precision aligned with the pinion 120 for accurate rotation in the relatively light casing 26. By means of accurately adjusted axial movement such as the foregoing along the axis 38, any residual assembly stresses in the spring steel disc 112 may be relieved as where after assembly it remains distorted as in a position such as at 112a. To this end, a long shanked indicator device 160 which is threadably received at its inner end in a deep tapped bore in the casing 26 is provided. A lock nut 162 surrounds the inner end of the indicating device 160 so as to lock the same in place in a predeterminedly accurate location. The sharp edged indicia means formed by a reversely tapered enlarged head 164 on the outer end of the indicator device 160 is used to line up a convenient point of the shafting, as say for instance, the line of demarcation between the flange 82 and the companion flange on the propeller shaft 34, in order to insure that the disc 112 is centered between the webs 96, 102 and that there are no residual assembly stresses in the disc 112 which is completely obscured from view following final assembly.

By reason of the previously noted slidable relationship, the inner tubular part 50 is easily axially slidable with respect to the companion hub part 52 carried by the case 26 for purposes of the foregoing described shim adjustment.

Due to working of the hull 14 as in a heavy sea and for other reasons which causes propeller shaft deflection and distortion, the longitudinal axis of the propeller shaft 34 tends at times to be misaligned somewhat with respect to the axis of the fixed shaft 36 and also with respect to the axes of the two parts of the herring bone gear 96, 102. Owing however, to the out of plane flexibility of the spring steel disc 112, the shaft 34 and associated parts are permitted to oscillate about a center point 166 defined by the intersection of the axis 38 and the normal plane of the disc 112. Additionally, the flanged end 72 of the shaft piece 74 laterally oscillates in unison therewith generally about the center 166 and is permitted such lateral movement of oscillation due to the radial clearance 64 about the bearing races 62 in the thrust bearing. The three or more spring members 70 in the latter tend to prevent any play from developing in the bearings 58, 60 and at the same time, co-act in permitting a hardly discernible canting action to occur during lateral movement of oscillation just described in connection with the flanged end 72.

In operation, the engine 10 drives the crankshaft 22 normally in a counter-clockwise rotation when viewed from the rear of the vessel, the accessory drive shaft 128 assumes this same rotation and also when the clutch disc 144 is engaged by the clutch piston 146 so as to lock up the planetary train in the component 126, the drive pinion 120 assumes this same counter-clockwise direction of rotation. The right and left teeth 118 on the output bipartite gear, however, are driven in a clockwise rotation so as to tend to drive the vessel astern through action of the left handed propeller 86. Engagement of the dual brake bands 150 in the alternative, however, provides for reversal of drive in the dual planetary drive in well-known manner and driving of the vessel forwardly even though the direction of the rotation of the engine 10 remains unchanged, that is counter-clockwise.

As the propeller shaft 34 flexes and tilts in operation, the spring steel disc 112 correspondingly distorts but continues to transmit torque drive solidly from the pinion driven gear teeth 18 to the bipartite gear and to the propeller shaft 34. Positive thrusts from the propeller shaft 34 due to the propeller 86 driving the vessel forwardly and also negative thrusts or tension resulting in the propeller shaft 34 due to driving the vessel rearwardly are equally well absorbed by the respective thrust bearings 58 and 60 which react against the shouldered ends of the bearing box 50. These thrusts are transmitted therefrom along the rigid shaft 36 to the engine bed 18 which receives their full reaction and requires no further assistance in relieving the transmission case 26 of substantially all function as a structural member subject to thrust loadings.

As herein disclosed, the herring bone gear in the reduction unit is shown produced as by a bipartite construction and in addition, the flange means at the inner and outer peripheries of the steel disc are shown to be of bipartite construction. It is evident that there are other ways of producing a herring bone type gear, for instance producing it integrally as evidenced by the showing of the one piece herring bone type pinion which meshes therewith, and though preferable it is not especially necessary to use the bipartite type construction in all or any of the instances above-enumerated. So also, the drawing shows that the speed reduction phase of the transmission and reduction gear operation occurs only between the offset type pinion and gear arrangement, but self-evidently a planetary type reduction component can be interposed between the forward and reversely driving transmission component and the drive pinion so as to provide a geared reduction drive speed to the drive pinion which in turn drives the gear at a 5:1 ratio as shown. The crankshaft of the engine is pitched rearwardly so as to be angularly related to the horizontal plane of the keel of the marine vessel and is parallel to the axially aligned shafts disposed below the engine but above the plane of the keel but indeed, it is not essential to the invention that this angular and non-angular arrangement prevail and the axially aligned shafts may be arranged such that they are not in parallelism to either the engine crankshaft or the plane of the keel and in such instance, it may be found desirable in fact to have the engine crankshaft and the keel plane in parallelism to one another.

We claim:

1. For use with a torque-producing source of prime power, a transmission aligned with and drivable by the prime power source and having case provided with a transversely offset gear reduction portion, a centrally-open pinion-driven gear of bipartite construction mounted in said offset case portion for rotation therein, a first shaft and a second propeller-connected shaft substantially coaxial therewith, said shafts extending in opposite directions from said case portion and disposed with their inner ends in spaced apart registry with respect to the central opening in the gear, a bed for supporting the source of prime power having a depending portion fixedly supporting the first shaft, a cylindrical hollow bearing box detachably carried by the inner end of said first shaft, said case portion having a tubular part freely slidably receiving said bearing box therein, stub shaft structure comprising a pair of detachably telescopically engaged shaft pieces extending into the central opening of said gear from the opposite sides thereof, torque-transmitting means supporting said stub shaft structure concentrically within such opening comprising a bipartite hub assembly splined thereto and a flexible metal disc having the outer periphery thereof clamped between the respective parts of the bipartite gear and the inner periphery clamped between the parts of the bipartite hub assembly, the distal end of one shaft piece of said pair being drivingly connected to the propeller-connected second shaft and the distal end of the other shaft piece being received in said bearing box, and means in said bearing box restraining said other shaft piece firmly to limited axial movement relative to the first shaft so as to oppose propeller thrust reaction in the second shaft and permitting limited transverse movement of the said other shaft piece within said bearing box so as to accommodate flexure-reaction-induced tilting movement of the stub shaft structure with respect to the central opening in the gear as a center.

2. For use with a torque-producing source of prime power, a transmission aligned with and drivable by the prime power source and having a case provided with a transversely offset gear reduction portion, a centrally-open pinion-driven gear mounted in said offset case portion for rotation therein, a first shaft and a second propeller-connected shaft substantially coaxial therewith, said shafts extending in opposite directions from said case portion and disposed with their inner ends in spaced apart registry with respect to the central opening in the gear, a hollow box detachably carried by the inner end of said first shaft, a bed for supporting the source of prime power having a depending portion fixedly supporting the first shaft, stub shaft structure comprising a pair of detachably telescopically engaged shaft members extending into the central opening of said gear from the opposite sides thereof, torque-transmitting means supporting said stub shaft structure concentrically within such opening comprising a hub assembly splined thereto and a flexible coupling element having a portion fastened to the gear and another portion fastened to the hub assembly, the distal end of one shaft member of said pair being drivingly connected to the propeller-connected second shaft and the distal end of the other shaft member being received in said bearing box, and means in said bearing box restraining said other shaft member from appreciable movement in an axial direction relative to the first shaft so as to oppose propeller thrust reaction in the second shaft and permitting limited transverse movement of the said other shaft member within said bearing box so as to accommodate flexure-reaction-induced tilting movement of the stub shaft structure with respect to the central opening in the gear as a center.

3. For use with a torque-producing source of prime power, a transmission aligned with and drivable by the prime power source and having a case provided with a transversely offset portion, a centrally-open pinion driven gear formed of bipartite structure mounted in said offset case portion for rotation therein, a first shaft and a second propeller-connected shaft substantially coaxial therewith, said shafts extending in opposite directions from said case portion and being disposed with their inner ends spaced apart and in registry with respect to the central opening in the gear, a bed for supporting the source of prime power having a depending portion fixedly supporting the said first shaft, a bearing-containing thrust bearing box detachably carried by the inner end of the first shaft, said case portion having a tubular part freely slidably receiving said bearing box therein, a hub formed of second bipartite structure disposed within said central opening in the first named bipartite structure and having means supported internally thereof and connected for rotation and thrust reception with respect to the second shaft, said means operatively engaging the bearing in said thrust bearing box, and a flexible plate disposed between the two-named bipartite structures and fixedly clamped between the individual parts of each structure for centering the second structure and simultaneously transmitting torque therefrom to the first named structure, in a manner to permit relative out-of-plane tilting action to occur as between the two bipartite structures.

4. For use with a torque-producing source of prime power, a transmission aligned with and drivable by the prime power source and having a case provided with a transversely offset portion, a centrally-open pinion driven gear formed of bipartite structure mounted in said offset case portion for rotation therein, a first shaft and a second propeller-connected shaft substantially coaxial therewith, said shafts extending in opposite directions from said case and having an interposed shaft extension means protruding through the central opening in the gear, said first shaft and said extension means being relatively rotatable and the latter being detachably affixed to the second shaft, a bed for supporting the source of prime power having a depending portion fixedly supporting the said first shaft, a hub formed of second bipartite structure disposed within said central opening in the first-named bipartite structure so as to be in a common plane therewith and having the shaft extension means supported internally thereof, and a flexible plate disposed in the plane with but between the two-named bipartite structures and fixedly clamped between the individual parts of each structure for centering the second structure and simultaneously transmitting torque therefrom to the first-named structure, in a manner to permit relative out-of-plane tilting action to occur as between the two bipartite structures.

5. Marine propulsion mechanism comprising an engine having a vertical midplane and provided with the combination of an engine bed having a rigid depending portion, a pair of substantially axially aligned relatively rotatable shaft members disposed in said vertical plane with one member engaging said depending bed portion, a forward and reversely driving reduction transmission coupled to said engine and having a downwardly offset output gear portion coaxial with respect to and surrounding the other said member in radially spaced relationship with respect thereto, said other member having a hub structure splined thereto and disposed within the radial space and between the member and said gear portion, and a deflectable plate disposed in said radial space in the plane of the gear portion and interconnecting the gear portion and hub structure so as to permit relative out-of-plane tilting movement of the latter.

6. Marine propulsion mechanism comprising an engine having a vertical midplane and provided with the combination of an engine bed having a rigid depending portion, a pair of substantially axially aligned relatively rotatable members disposed in said vertical plane with one member engaging said depending bed portion, a forward and reversely driving reduction transmission coupled to said engine and having a downwardly offset output gear portion coaxial with respect to and surrounding the other said member in radially spaced relationship with respect thereto, said other member having a hub structure connected for rotation therewith and disposed within the radial space aforesaid and between the member and said gear portion, and a deflectable plate formed of spring steel disposed in said radial space substantially in the mean plane of the gear portion and interconnecting the gear portion and hub structure so as to permit relative out-of-plane tilting movement of the latter.

7. Structurally integrated prime mover mechanism comprising an engine provided with an engine bed thereunder having a rigid depending portion, a gear case portion containing an output gear in spaced apart alignment with respect to said depending bed portion, a thrust transmitting reaction member disposed between the gear case and bed portions and affixed to the latter, means providing forward and reversely driving power paths between the engine and the output gear, first and second members having flanged ends and extending into the hub of the gear and secured together in telescopically overlapping relationship, means thrusting against said reaction member and clampingly engaging the flanged end of said first member to permit anti-friction relative rotation between the just-named members, the flanged end of the second member being adapted for attachment to a propeller-connected shaft member, and means including a laterally flexing torsion transmitting element connecting both the first and second members and said gear.

8. Structurally integrated prime power mechanism comprising an engine having a vertical midplane and being provided with an engine bed having an offset portion, an offset gear case portion containing a rotatable output gear in alignment with but spaced apart with respect to said offset bed portion, a cylindrical box, a stiff shaft carrying the cylindrical box at one end thereof and having first connecting means rigidly connecting the opposite end of the shaft to said depending bed portion, said shaft and said box being disposed in said midplane and having second connecting means slidably connecting said box and said case portion for axial movement, two members extending into the hub of the output gear and detachably secured together to form a shaft extension, third connecting means relatively rotatably connecting said shaft extension and said box, and means including a spring steel disc flexibly coupling together said shaft extension and said output gear.

9. Structurally integrated prime power mechanism comprising an engine having a vertical midplane and being provided with an engine bed having a rigid depending portion, an offset gear case portion containing a rotatable output gear spaced apart with respect to said depending bed portion, a cylindrical box, a stiff shaft member carrying the cylindrical box at one end thereof and having first connecting means connecting the opposite end of the shaft to said depending bed portion, said shaft and said box being disposed in said midplane and having second connecting means slidably connecting said box and said base portion for relative axial movement in sealed engagement, two shaft members extending from opposite directions into the hub of the output gear and telescopically secured together therein to form a propeller shaft extension, bearing means rotatably connecting said shaft extension and said box, and means including a spring steel disc flexibly coupling together a portion of said shaft extension and said output gear and thereby permitting slight axial shift of the former with respect to the plane of the latter, said first connecting means including shim stock to provide for axial adjustment of the aforesaid shaft members in centering the shaft extension with respect to the output gear and eliminating pre-stressing end loads on the disc.

10. Structurally integrated prime power mechanism comprising an engine having a vertical midplane and being provided with an engine bed having a rigid depending portion, an offset gear case portion containing a rotatable output gear spaced apart with respect to said depending bed portion, a cylindrical box, a stiff shaft member carrying the cylindrical box at one end thereof and having first connecting means connecting the opposite end of the shaft to said depending bed portion, said shaft and said box being disposed in said midplane and having second connecting means slidably connecting said box and said case portion for axial movement in sealed engagement, two shafts extending from opposite directions into the hub of the output gear and telescopically secured together therein to form an extension for a propeller shaft, third connecting means connecting said shaft extension and said box for relative rotation, and an indicator device externally mounted to said case portion and relatively transversely alignable with respect to a point on one of the aforesaid shafts, said first connecting means including removable and replaceable shim stock to provide for axial adjustment of the aforesaid shafts in transversely aligning said point with respect to said indicator device.

11. Structurally integrated prime power mechanism comprising an engine having a vertical midplane and being provided with an engine bed having a rigid depending portion, an offset gear case portion containing a rotatable output gear spaced apart with respect to said depending bed portion, a cylindrical box, a stiff shaft carrying the cylindrical box at one end thereof and having first connecting means connecting the opposite end of the shaft to said depending bed portion, said shaft and said box being disposed in said midplane and having second connecting means slidably connecting said box and said case portion for axial movement in sealed engagement, two shaft members extending into the hub of the output gear and telescopically secured together therein to form a propeller shaft extension, third connecting means connecting said shaft extension and said box for relative rotation, and means including a spring steel disc flexibly coupling together a portion of said shaft extension and said output gear for accommodating slight axial shift of the former with respect to the plane of the latter, said first connecting means including shim means removable and replaceable to provide for axial adjustment of said shaft members in relieving the disc of residual distortion due to inaccuracies of assembly, said third connecting means comprising a span of anti-friction thrust bearings.

12. In combination with a gear casing incorporating a relatively large tubular hub part and a relatively small shaft piece mounted for rotation in the casing and having at least a portion thereof surrounded by the hub part: bearing races of a predetermined diameter and antifriction elements cooperating therewith to form a thrust bearing span clampingly engaging said shaft portion, a second tubular part slidably related to the hub part so as to be disposed one part within the other with the interior of the inner part at points adjacent said races being of an internal diameter of at least substantially 0.3% larger than said predetermined diameter to provide for lateral clearance for the races and having internal shoulders incorporated at the ends, said inner part and said outer part being relatively adjustable in an axial direction owing to their aforesaid slidable relationship so as to relieve the casing of direct axial shaft thrusts and said inner part and said bearing races being relatively adjustable in a radial direction owing to the aforesaid lateral clearance so as to accommodate shifting movement of the shaft portion in planes containing its longitudinal axis, and elastic means disposed between and engaging said internal shoulders and said races in a direction to urge the latter toward one another.

13. In combination with a gear casing incorporating a relatively large tubular hub part and a relatively small shaft piece mounted for rotation in the casing, and having at least a portion thereof surrounded by the hub part: means including bearing races of a predetermined diameter forming a thrust bearing span clampingly engaging said shaft portion, a second tubular part slidably received within the hub part so as to form an inner part within the outer hub part with the interior of the inner part at points adjacent said races being of an internal diameter larger than said predetermined diameter to provide for lateral clearance for the races, and having internal shoulders incorporated at the ends, said inner part and said outer part being relatively adjustable in an axial direction owing to their aforesaid slidable relationship so as to relieve the casing of direct axial shaft thrusts and said inner part and said bearing races being relatively adjustable in a radial direction owing to the aforesaid lateral clearance so as to accommodate shifting movement of the shaft portions in planes containing its longitudinal axis and elastic means disposed between and engaging said internal shoulders and said races in a direction to urge the races toward one another.

14. In combination with a gear casing incorporating a relatively large tubular hub part and a relatively small shaft mounted for rotation along its longitudinal axis in the casing, and having at least a portion thereof surrounded by the hub part: means including bearing races of a predetermined outside diameter forming a thrust bearing span clampingly engaging said shaft portion, a second tubular part surrounding the bearing span and slidably received in the hub part so as to form an inner part within the outer hub part with the interior of the inner part at points adjacent said races being of an internal diameter larger than said predetermined diameter to provide for lateral clearance for the races, and internal shoulders incorporated at the ends of the outer and inner parts, said inner part and said outer part being relatively adjustable in an axial direction owing to their aforesaid slidable relationship so as to relieve the casing of direct axial shaft thrusts and said inner part and said bearing races being relatively adjustable in a radial direction owing to the aforesaid lateral clearance so as to accommodate shifting movement of the shaft portion in planes containing its longitudinal axis aforesaid.

15. In combination, an open centered gear, means for mounting said gear for rotation in a relatively fixed position, propeller shaft means having an end extended into and protruding through and spaced from the center of the gear thereby permitting relative motion of the shaft with respect to the gear, said shaft having variable thrust loads imposed thereon, a flexible circular steel diaphragm in the mean plane of the gear flexibly connected between and torsionally coupling together the gear and the shaft means, and means rotatably engaging said protruding end of the shaft means to absorb axial propeller shaft thrust.

16. In combination, an open centered gear, means for mounting said gear for rotation in a relatively fixed position, shaft means having an end portion extending into and protruding through the center of the gear, said shaft having variable thrust loads imposed thereon, flexible coupling means in the mean plane of the gear and flexibly connected between and torsionally coupling together the gear and the shaft means, bearing means for the end of said shaft, and supporting means for said bearing, said bearing means and its support including bearing elements to provide a limited transversely slidable and axially shiftable engagement between said protruding end portion of the shaft means and said bearing support for substantially restraining the shaft against axial movement.

17. In combination, an open centered gear, means for mounting said gear for rotation in a relatively fixed position, shaft means extending into and protruding through the center of the gear, said shaft having variable thrust loads imposed thereon, flexible coupling means flexibly connected between and torsionally coupling together the gear and the shaft means, a thrust load supporting means including a tubular part, said part being supported in closely spaced adjacency to the coupling means, a bearing case mounted to have a limited sliding movement with respect to the supported part, and thrust bearings in the slidable case within which the protruding end of the shaft means is journaled whereby thrust loads being transmitted by said shaft may be transferred to said supporting means.

References Cited in the file of this patent

UNITED STATES PATENTS

| | | |
|---|---|---|
| 864,942 | Witt | Sept. 3, 1907 |
| 2,179,425 | Ruegg | Nov. 7, 1939 |
| 2,245,815 | Peterson et al. | June 17, 1941 |
| 2,345,437 | Tinker | Mar. 28, 1944 |
| 2,500,723 | Ware | Mar. 14, 1950 |

FOREIGN PATENTS

| | | |
|---|---|---|
| 386,886 | Great Britain | Jan. 26, 1933 |